(12) United States Patent
Wyatt (10) Patent No.: US 8,214,654 B1
(45) Date of Patent: *Jul. 3, 2012

(54) METHOD AND SYSTEM FOR LOADING A SECURE FIRMWARE UPDATE ON AN ADAPTER DEVICE OF A COMPUTER SYSTEM

(75) Inventor: David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 826 days.

This patent is subject to a terminal disclaimer.

(21) Appl. No.: 12/247,138

(22) Filed: Oct. 7, 2008

(51) Int. Cl.
*G06F 12/14* (2006.01)

(52) U.S. Cl. .................................. 713/191

(58) Field of Classification Search ............ None
See application file for complete search history.

(56) References Cited

U.S. PATENT DOCUMENTS

| | | | |
|---|---|---|---|
| 2003/0191955 A1 | 10/2003 | Wagner et al. | |
| 2005/0021968 A1* | 1/2005 | Zimmer et al. | 713/176 |
| 2007/0073995 A1 | 3/2007 | Rudelic | |
| 2008/0240420 A1* | 10/2008 | Oxford | 380/28 |
| 2010/0011151 A1 | 1/2010 | Chu et al. | |

OTHER PUBLICATIONS

Office Action in U.S. Appl. No. 12/247,112, mailed May 13, 2011.

* cited by examiner

*Primary Examiner* — Brandon Hoffman (74) *Attorney, Agent, or Firm* — Patterson & Sheridan, LLP (57) ABSTRACT

One embodiment of the present invention sets forth a method for loading a secure firmware update onto an adapter device in a computer system. The method includes the steps of sending a duplet of encrypted data conveying a same portion of an encrypted update image along a transfer path to the adapter device, restoring two portions of source data from the duplet, and determining whether to accept the source data based on the result of a comparison of the two portions of source data.

21 Claims, 8 Drawing Sheets

METHOD AND SYSTEM FOR LOADING A SECURE FIRMWARE UPDATE ON AN ADAPTER DEVICE OF A COMPUTER SYSTEM

BACKGROUND OF THE INVENTION

1. Field of the Invention

Embodiments of the present invention generally relate to adapter devices incorporated in computer devices, and more specifically, to methods and systems for loading a secure firmware update on an adapter device of a computer system.

2. Description of the Related Art

Because the use of high-definition ("HD") digital content becomes more popular, an increasing number of commercialized computer devices incorporate graphics processing systems that are compatible with the High-Definition Multimedia Interface ("HDMI") for transmitting HD digital content to a HDMI-compatible display device. Conventionally, in order to be compatible with the HDMI, the graphics processing system is coupled to a specific adapter device, i.e. an encoder chip, via an Inter-Integrated Circuit ("I²C") serial interface. The encoder chip is configured to convert the pixel data from the graphics processing system into the Transition Minimized Differential Signaling ("TMDS") format for transmission over the HDMI. The tasks performed by this encoder chip are usually programmed in a firmware stored in a memory embedded on the encoder chip.

As the HDMI standard evolves, updates of the encoder firmware may be released from the encoder manufacturer to enable the encoder to support upgraded versions of the HDMI standard. However, because the firmware update includes proprietary contents, it is important that the firmware update does not become exposed when it is loaded via the I²C interface onto the encoder. Such exposure of the firmware update during its loading may not only facilitate unauthorized replications or misuses of the firmware update, but also render content protection implemented on the encoder vulnerable to attacks by a hacker.

As the foregoing illustrates, what is needed in the art is thus a system and method that are able to load a firmware update on an adapter device of a computer system in a confidential and secure manner, and address at least the foregoing issues.

SUMMARY OF THE INVENTION

One embodiment of the present invention sets forth a method for loading a secure firmware update onto an adapter device in a computer system. The method includes the steps of sending a duplet of encrypted data conveying a same portion of an encrypted update image along a transfer path to the adapter device, restoring two portions of source data from the duplet, and determining whether to accept the source data based on the result of a comparison of the two portions of source data.

By using encrypted duplets to load the firmware update on the adapter device, one advantage of the disclosed method and system is that unwanted accesses to the sensitive content of the firmware on the encoder can be prevented in an efficient manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the drawings. It is to be noted, however, that the drawings illustrate only typical embodiments of this invention and are therefore not to be considered limiting of its scope, for the invention may admit to other equally effective embodiments.

DETAILED DESCRIPTION

The present application describes methods and systems for loading a secure firmware update on an adapter device of a target computer system. The firmware update for the adapter device is released as a software update package that includes an encrypted update image and an upload utility. The encrypted update image contains duplets of encrypted data obtained by encrypting twice each source data of the source firmware update. During execution, the upload tool extracts the encrypted update image, and sends each duplet through a secure transfer path to the adapter device. Because the encryption of each duplet used confidential keys and information specific to only approved computer systems, the encrypted duplet cannot be successfully decrypted on unauthorized computer systems. Impermissible misuses of the firmware update on unauthorized computer systems are thus prevented.

Figure 1A:
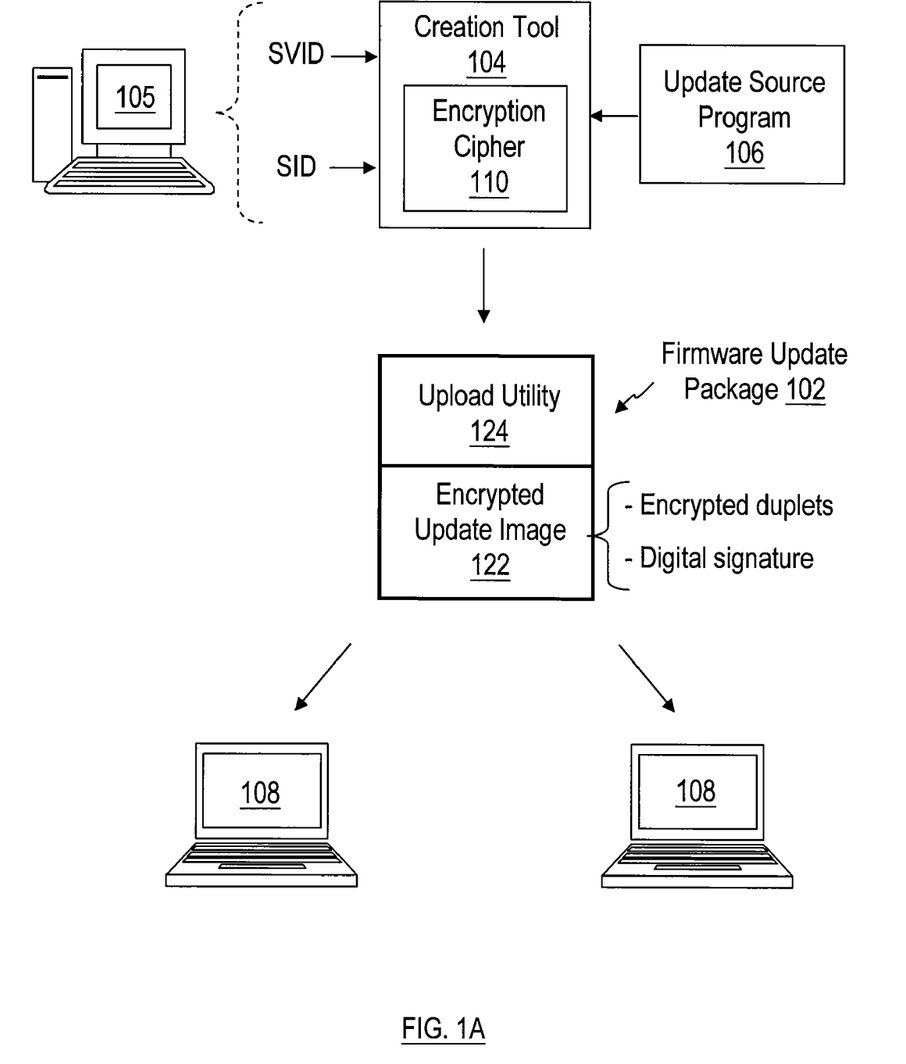
FIG. 1A is a simplified diagram illustrating how a secure firmware update package is generated according to one embodiment of the present invention.

FIG. 1A is a simplified diagram illustrating how a secure firmware update package 102 is generated according to one embodiment of the present invention. The firmware update package 102 is generated by a creation tool 104, which be provided as an application program executable on a programmer's computer device 105. In one embodiment, the computer device 105 may be any conventional computer systems including a system memory and a central processing unit ("CPU") adapted to execute programs stored in the system memory. The creation tool 104 accepts as inputs an update source program 106 and information for identifying target computer systems 108 on which the use of the update source program 106 is authorized. In one embodiment, the information for identifying the authorized target computer systems 108 may include a vendor identifier SVID and a model identifier SID. Using the identifiers SVID and SID, an encryption cipher 110 in the creation tool 104 encrypts the update source program 106 to form an encrypted update image 122, and appends the encrypted update image 122 to the program code of an upload utility 124 to generate the firmware update package 102.

Figure 1B:
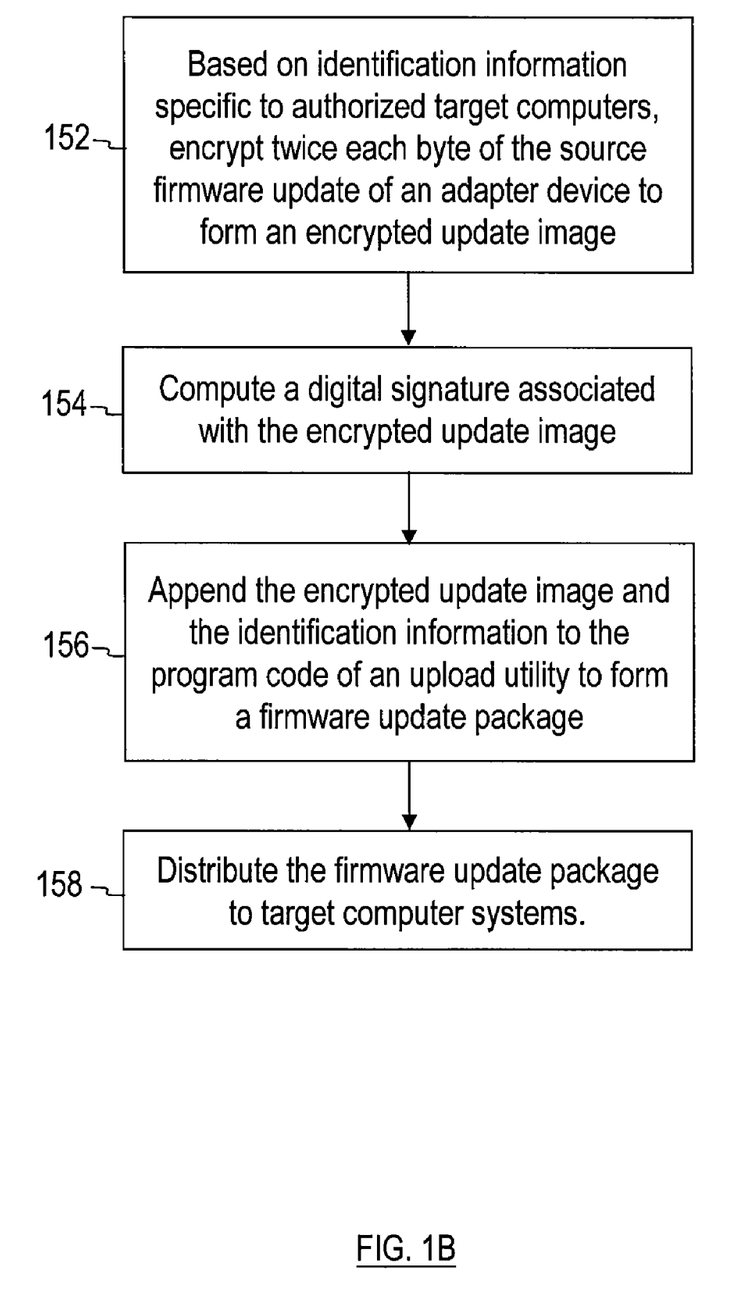
FIG. 1B is a flowchart of method steps for generating a firmware update package according to an embodiment of the present invention.

FIG. 1B is a flowchart of method steps for forming the firmware update package 102, according to one embodiment of the present invention. In initial step 152, the encryption cipher 110 generates the encrypted update image 122 by using identification information SVID and SID specific to the authorized target computer systems 108. More particularly, in one embodiment, the encrypted update image 122 may be generated through an encryption process in which each byte of the update source program 106 in a plain-text form is encrypted twice with a same encryption key to form a duplet of two encrypted bytes that appear as different cipher-texts, but produce the same byte when decrypted. The encryption key may be computed from the identification information SVID and SID specific to the authorized target computer systems 108. In step 154, the creation tool 104 may also computes a digital signature associated with the encrypted update image 122 to add protection against tampering attempts by a rogue agent. The digital signature may be verified later by the upload utility 124 before the encrypted update image 122 is actually loaded to the adapter device on the target computer system. In step 156, the encrypted update image 122 including the duplets of encrypted bytes, the digital signature, and the identifier information SVID and SID are then appended to the program code of the upload utility 124 to generate the firmware update package 102, which is executable as a self-installer program on a target computer system 108. In step 158, the firmware update package 102 can then be distributed to target computer systems 108 for loading the firmware update on the adapter device.

During execution on a target computer system, the upload utility 124 extracts the encrypted update image 122 and the identifier information SVID and SID, and loads the encrypted update image 122 byte-by-byte through a secure transfer path to the adapter device to update. At a point on the secure transfer path, the two source bytes of each duplet are restored and compared to verify that the currently transferred byte comes from a trustable source and has not been tampered. As a result, the duplet encryption scheme allows to maintain confidentiality of the update source program 106, and prevents impermissible replications or reuses in replay attacks.

Figure 2:
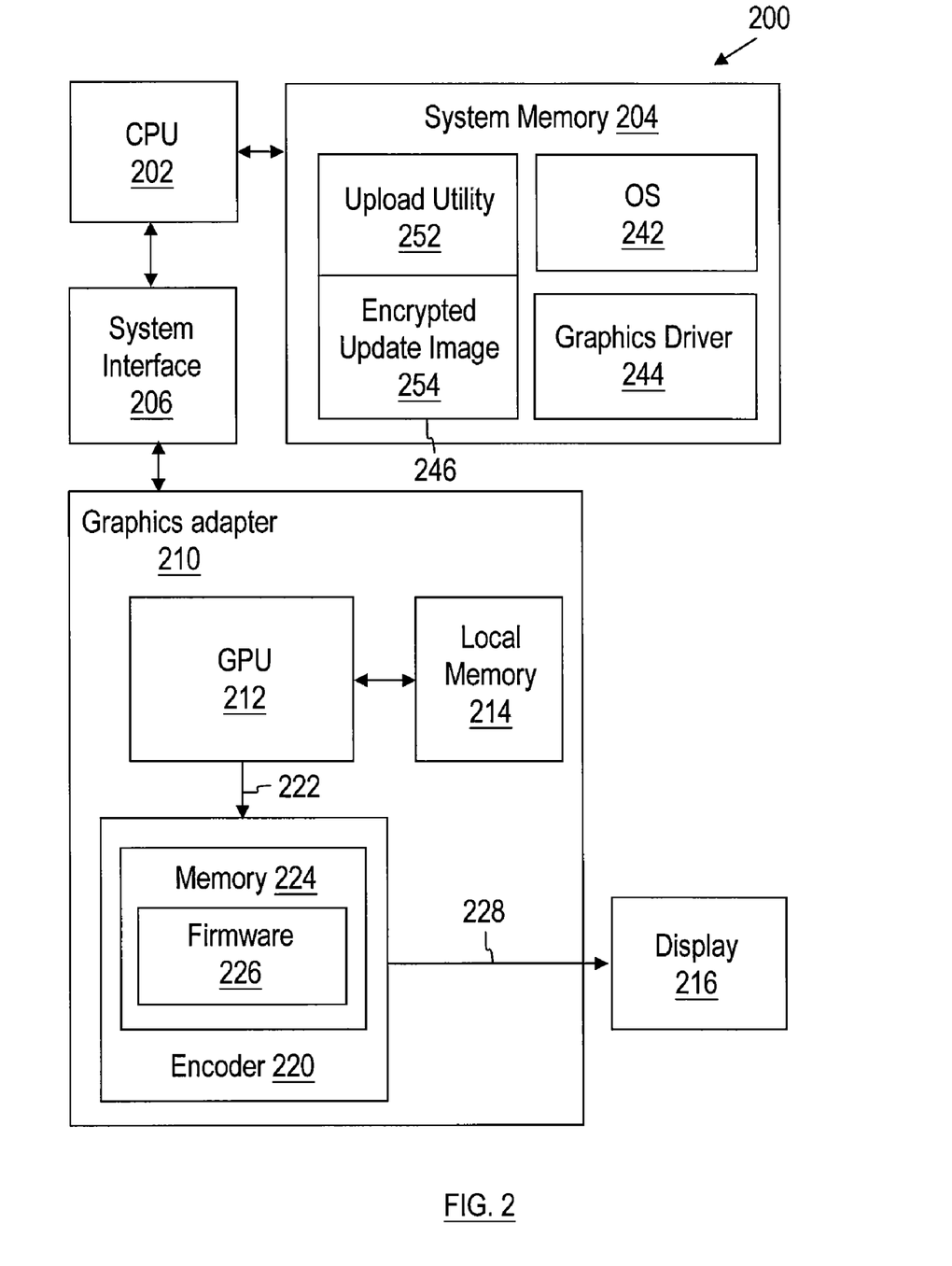
FIG. 2 is a schematic diagram of a target computer system according to one or more aspects of the present invention.

FIG. 2 is a schematic diagram of a target computer system 200 adapted to implement one or more aspects of the present invention. The computer system 200 may be laptop computer, palm-sized computer, tablet computer, a desktop computer, server, game console, cellular telephone, hand-held device, computer-based simulator, or the like. The computer system 200 comprises a central processing unit ("CPU") 202, a system memory 204, a system interface 206, and a graphics adapter 210. The CPU 202 connects to the system memory 204, and the graphics adapter 210 via the system interface 206. The system interface 206 may include a system bus, a memory controller, Accelerated Graphics Port ("AGP"), Peripheral Component Interface Express ("PCIE") bus, and other industry standard interfaces adapted to couple the CPU 202 and the graphics adapter 210.

In response to instructions transmitted by the CPU 202, the graphics adapter 210 is configured to process graphics and/or audio data. In one embodiment, the graphics adapter 210 comprises a graphics processing unit ("GPU") 212 that is coupled to a local memory 214 and an adapter device, such as encoder 220. The local memory 214 store program instructions and graphics data processed by the GPU 212 to render images for presentation on a display device 216. The encoder 220 is coupled to the GPU 212 via a serial bus, such as an Inter-Integrated Circuit ("I²C") interface 222. The encoder 220 is a microcontroller chip that includes its own local memory 224. The memory 224 stores a firmware 226 that is executable on the encoder 220 to perform encoding on pixel data provided by the GPU 212. In one embodiment, the encoder 220 may be configured to convert pixel data provided by the GPU 212 into a Transition Minimized Differential Signaling ("TMDS") format for transmission over a High-Definition Multimedia Interface ("HDMI") 228 to the display device 216. In other embodiments, the encoder 220 may also be configured to implement the High-Bandwidth Digital Content Protection ("HDCP") protocol to transmit secure premium content through the HDMI 228 to the display device 216. Because the firmware 226 contains sensitive content, it is desirable that updates of the firmware 226 are loaded on the encoder 220 in a confidential and secure manner.

Referring to FIG. 1A again, the system memory 204 contains an operating system ("OS") 242, a graphics driver 244, and a firmware update package 246. In one embodiment, the firmware update package 246 is used to update the firmware 226 of the encoder 220. The firmware update package 246 includes an upload utility program 252 and an encrypted update image 254. The upload utility program 252 is configured to extract the encrypted update image 254, apply verification tests on the encrypted update image 254 and the computer system 200, and call functions of an application programming interface ("API") in the OS 242 to have the graphics driver 244 load the encrypted update image 254 along a secure transfer path to the encoder 220. The encrypted update image 254 includes duplets of encrypted bytes generated by encrypting twice each byte of the firmware update source program, such as previously described in conjunction with FIG. 1A. As the encrypted update image 252 is being loaded onto the encoder 220, the two source data bytes of each duplet are decrypted and compared to verify the integrity of the encrypted update image 254.

Figure 3:
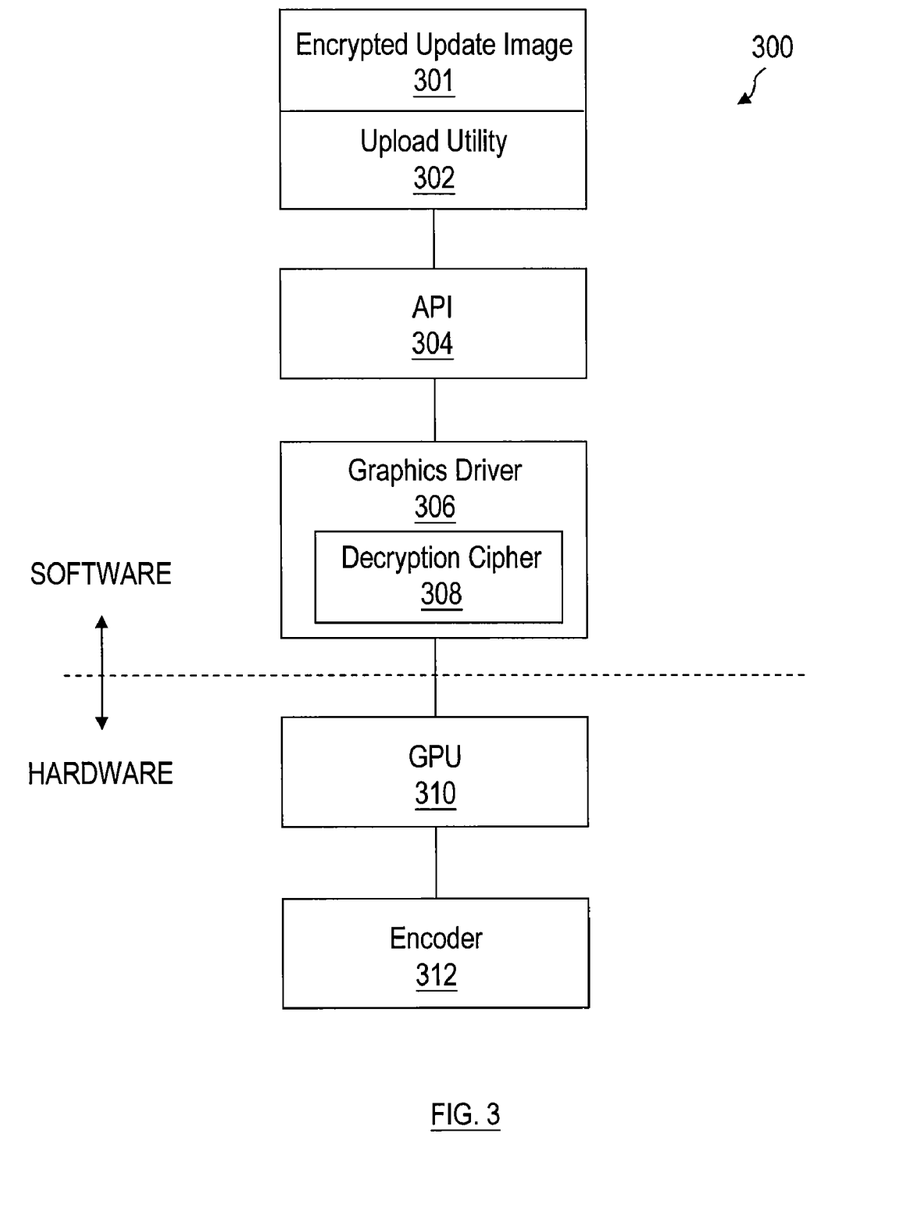
FIG. 3 is a schematic diagram illustrating how a secure transfer path is implemented for loading an encrypted update image in a target computer system, according to one embodiment of the present invention.

FIG. 3 is a schematic diagram illustrating how a secure transfer path 300 is implemented for loading an encrypted update image 301 in a target computer system, according to one embodiment of the present invention. The secure transfer path 300 comprises an upload utility 302, an API 304, a graphics driver 306 including a decryption cipher 308, a GPU 310 and an encoder 312. The upload utility 302 is configured to extract the encrypted update image 301, authenticate a signature associated with the encrypted update image 301, and verify whether the target computer system is an approved system for the firmware update. The upload utility 302 also invokes function calls in the API 304 that execute through the graphics driver 306 to send duplets of the encrypted update image 301 a byte at a time along the transfer path 300 to the encoder 312. An invoked function of the API 304 may include, for example, an I²C write command to send encrypted duplets to the encoder 312. The two source data bytes of each encrypted duplet are restored by the decryption cipher 308 in the graphics driver 306, and are then compared to verify that the source data byte comes from a trustable source. Based on the result of the comparison, the graphics driver 306 is configured to decide whether the source data byte can be transferred via the GPU 310 to the encoder 312.

Figure 4:
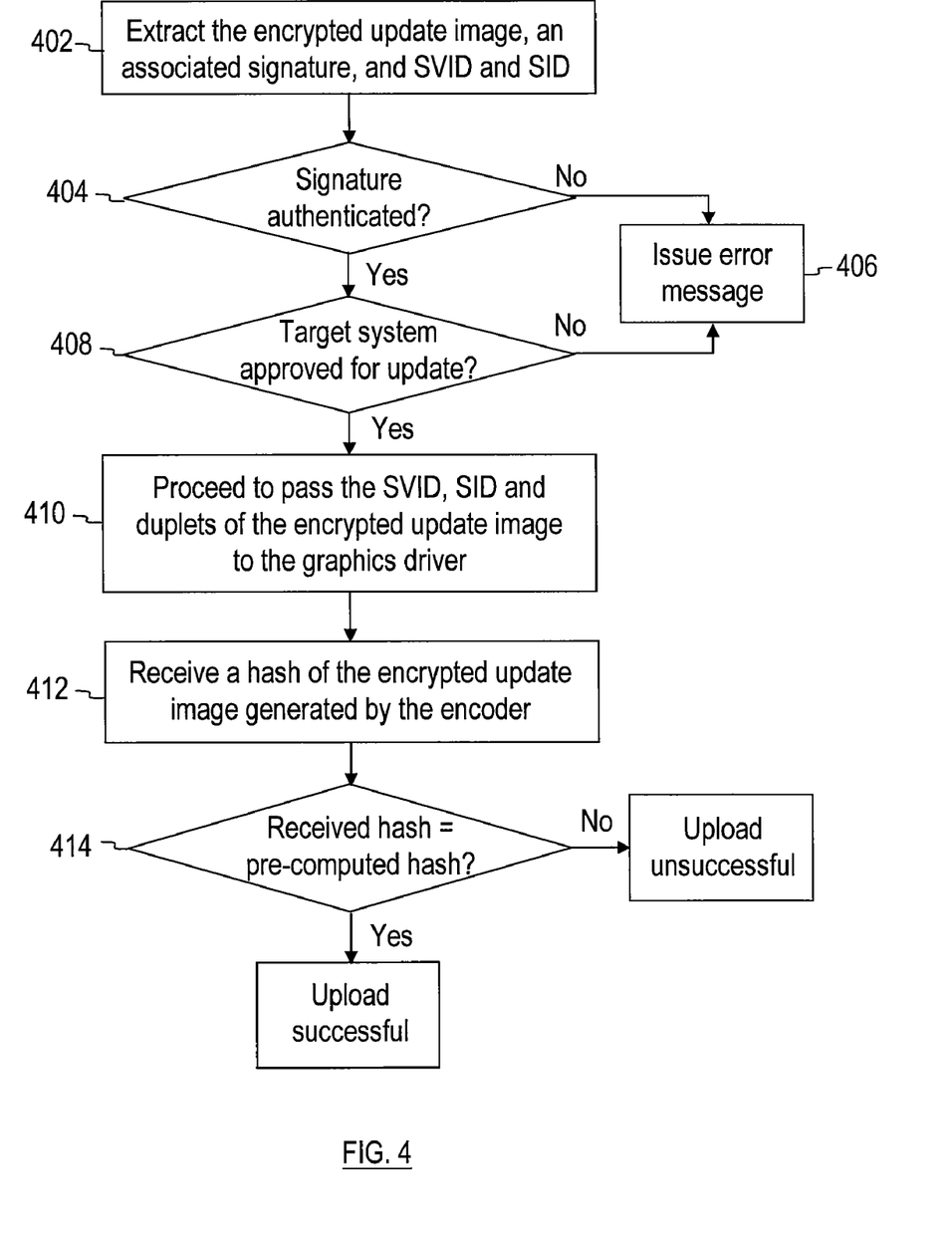
FIG. 4 is a flowchart of method steps performed by the upload utility of FIG. 3 for loading the encrypted update image through a secure transfer path, according to one embodiment of the present invention.

FIG. 4 is a flowchart of method steps performed by the upload utility 302 for loading the encrypted update image 301 through the secure transfer path 300, according to one embodiment of the present invention. In initial step 402, the upload utility 302 extracts the encrypted update image 301, a signature associated with the encrypted update image 301, and identification information SVID and SID for identifying an approved target computer system. In step 404, the upload utility 302 computes a hash value of the encrypted update image 301 to authenticate the signature. If the signature is not authenticated, the upload utility 302 in step 406 issues an error message. On the other hand, if the signature is authenticated, the upload utility 302 in step 408 further checks whether the target computer system is an approved system based on the vendor identification information SVID and SID extracted from the encrypted update image. If the target computer system is not an approved system, step 406 is performed to issue an error message. If the target computer system is an approved system, the upload utility 302 in following step 410 proceeds to pass the SID, SVID, and bytes of encrypted update image 301 to the graphics driver 306 using I²C write commands. Once the transfer of the encrypted update image 301 is completed, in step 412, the upload utility 302 receives a hash value of the encrypted update image 301 computed by the encoder 312. In step 414, the upload utility 302 then compares the hash value returned by the encoder 312 against a pre-computed hash value. If the two hash values are identical, the transfer of the firmware update to the encoder 312 is successful. Otherwise, an unsuccessful transfer of the firmware update is detected.

Figure 5:
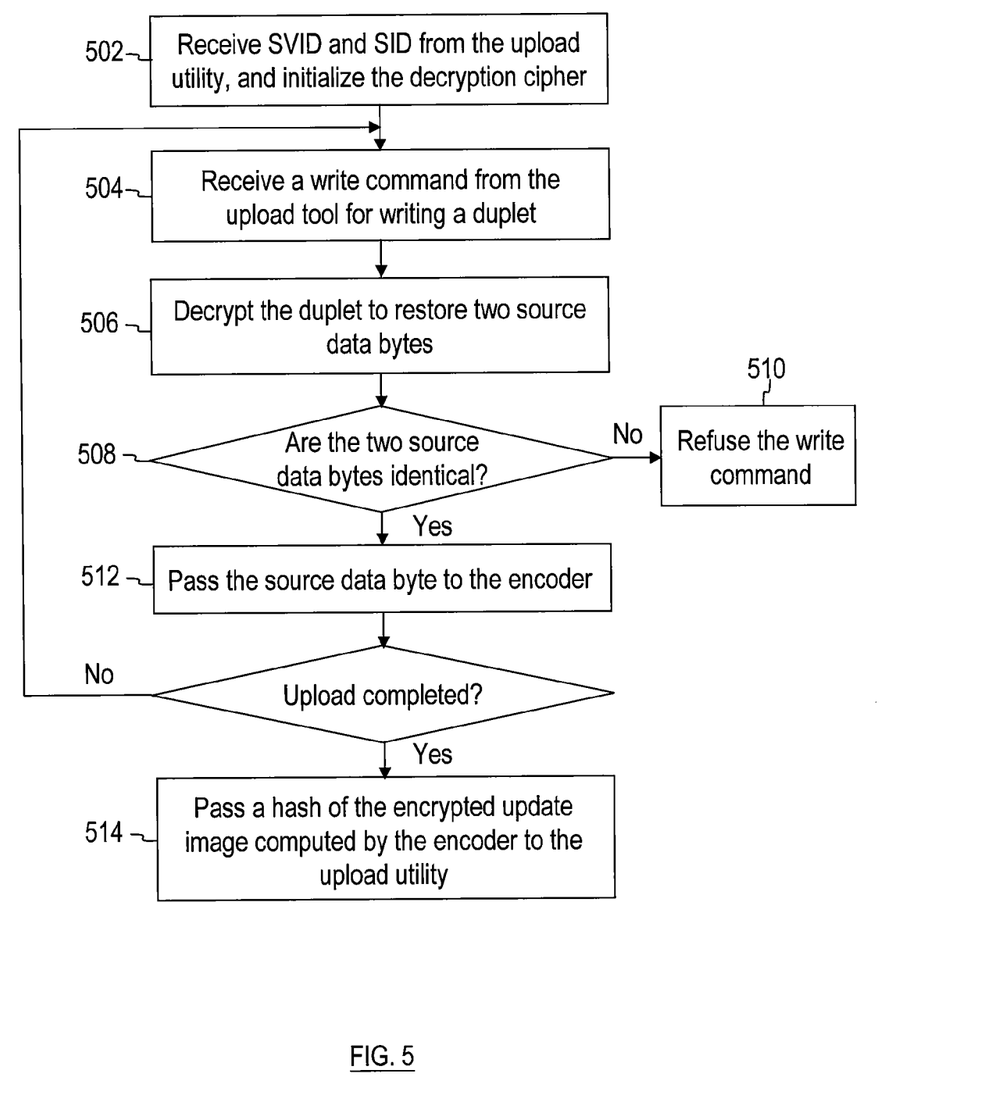
FIG. 5 is a flowchart of method steps performed by the graphics driver of FIG. 3 for loading the encrypted update image through a secure transfer path, according to one embodiment of the present invention.

FIG. 5 is a flowchart of method steps performed by the graphics driver 306 for loading the encrypted update image 301 through the secure transfer path 300, according to one embodiment of the present invention. In initial step 502, the graphics driver 306 receives the identification information SVID and SID from the upload utility 302, and initializes the decryption cipher 308. In step 504, the graphics driver 306 receives a command from the upload utility 302 to write a duplet of encrypted bytes of the encrypted update image 301. In step 506, the decryption cipher 308 then proceeds to decrypt the duplet to restore two source data bytes using a decryption key computed from the identification information SVID and SID. In step 508, the two decrypted source data bytes are then compared against each other to determine whether they come from a trustable source. If the two source data bytes are not identical, the source data bytes likely come from an unapproved firmware update, and the graphics driver 306 in step 510 consequently refuses the write command. If the two source data bytes are identical, in step 512, the graphics driver 306 accepts the write command and transfers the source data byte along the transfer path 300 to the encoder 312. Steps 504-512 are repeated until the decrypted firmware update is completely transferred to the encoder 312. In step 514, once the transfer of the firmware update is completed, the graphics driver 306 passes a hash of the encrypted update image 301 computed by the encoder 312 to the upload utility 302. As described previously, the upload utility 302 may then compare the returned hash value with a pre-computed hash value to determine whether the firmware update has been successfully loaded on the encoder 312.

By loading the firmware update in the form of encrypted duplets, the secure transfer path 300 can prevent direct access to the sensitive content of the firmware on the encoder 312. It is worth noting that while the foregoing embodiments have the duplet decryption step performed by the graphics driver 306, alternate embodiments described below may also have the decryption step performed on the encoder.

Figure 6:
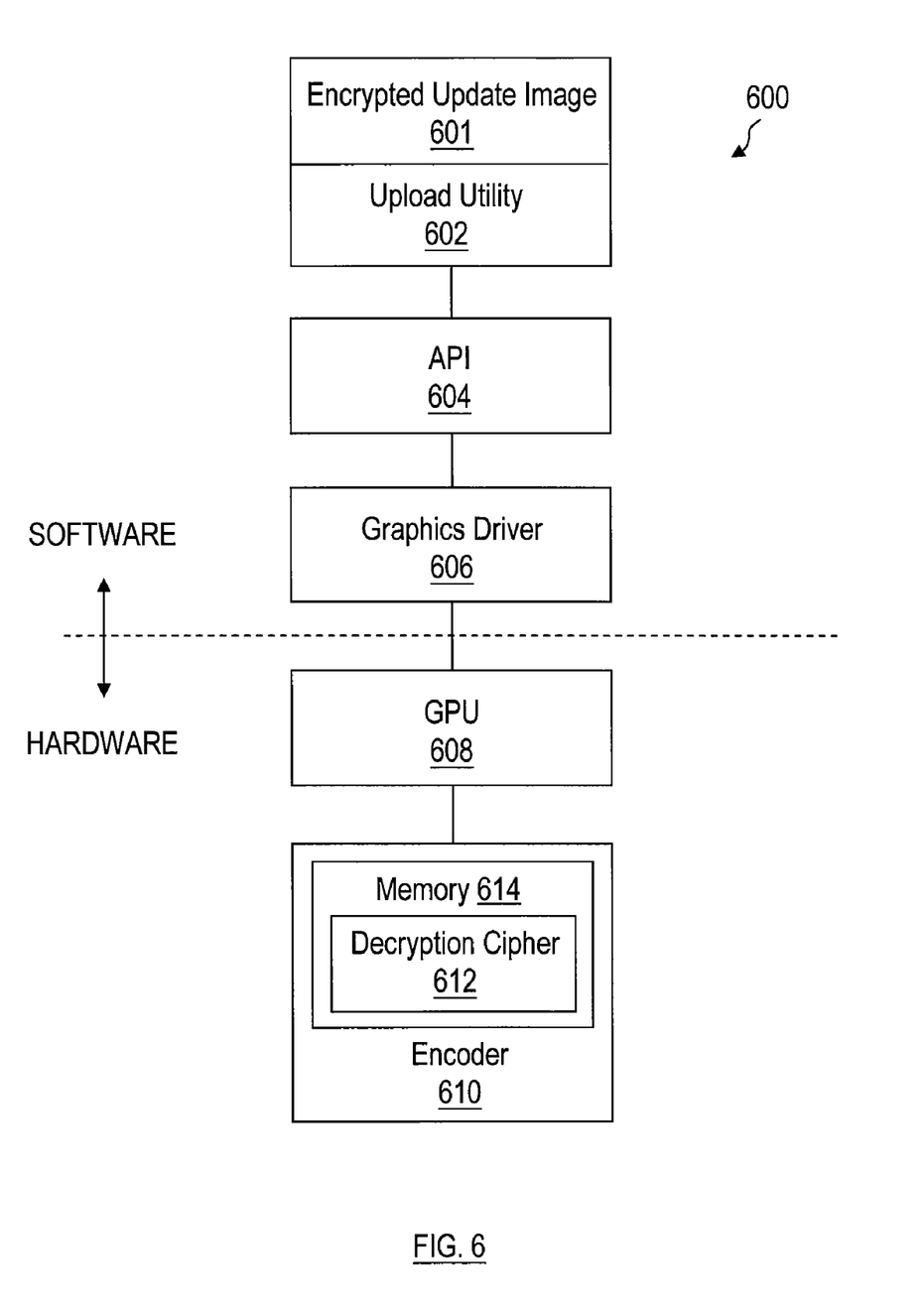
FIG. 6 is a schematic diagram illustrating the implementation of a secure transfer path for loading an encrypted update image in a target computer system, according to another embodiment of the present invention.

FIG. 6 is a schematic diagram illustrating the implementation of a secure transfer path 600 for loading an encrypted update image 601 in a target computer system, according to another embodiment of the present invention. The secure transfer path 600 includes an upload utility 602, an API 604, a graphics driver 606, a GPU 608 and an encoder 610. Like in the previous embodiment, the upload utility 602 is configured to extract the encrypted update image 601, authenticate a signature associated with the encrypted update image 601, and verify whether the target computer system is an approved system for the firmware update. In addition, the upload utility 602 is also configured to invoke function calls in the API 604 that execute through the graphics driver 606 to send duplets of the encrypted update image 601 a byte at a time along the transfer path 600 to the encoder 610. A decryption cipher 612, stored in a memory 614 of the encoder 610, is executable on the encoder 610 to restore the two source data bytes of each encrypted duplet received from the upload utility 602. The encoder 610 then compares the two source data bytes to determine whether the received source data byte is acceptable. Once the load of the firmware update image is completed, the encoder 610 is also configured to compute and return a hash of the encrypted update image 601 to the upload utility 602 to confirm a successful data transfer.

In this embodiment, the method steps performed by the upload utility 602 are substantially the same as those of the previously described upload utility 302. Furthermore, the graphics driver 606 is configured to simply pass the duplets sent out by the upload utility 602 to the encoder 610 without performing any decryption steps. The decryption and verification of the duplets are performed on the encoder 610 provided with the adequate decryption cipher 612.

Figure 7:
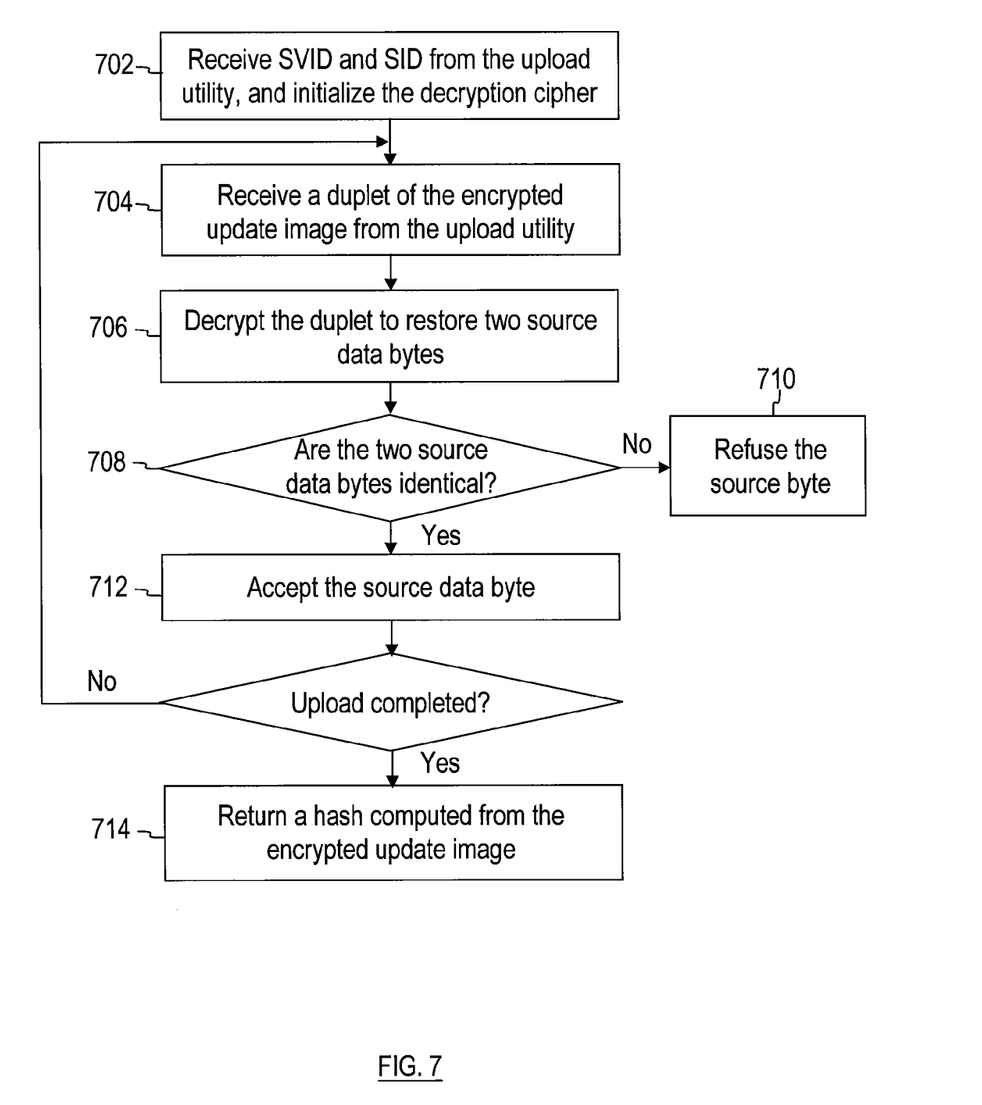
FIG. 7 is a flowchart of method steps performed by the encoder of FIG. 6 for loading the encrypted update image, according to one embodiment of the present invention.

FIG. 7 is a flowchart of method steps performed by the encoder 610 for loading the encrypted update image 601, according to one embodiment of the present invention. In initial step 702, the encoder 610 receives the identification information SVID and SID from the upload utility 602, and initializes the decryption cipher 612. In step 704, the encoder 610 receives a duplet of the encrypted update image 601 sent from the upload utility 602. In step 706, the decryption cipher 612 then proceeds to decrypt the duplet to restore two source data bytes. In step 708, the two decrypted source data bytes are compared against each other to determine whether they come from a trustable source. If the two source data bytes are not identical, the source data bytes come from an unapproved firmware update, and the encoder 610 in step 710 consequently refuses the source data byte. If the two source data bytes are identical, the encoder 610 in step 712 accepts the source data byte. Steps 704-712 are repeated until the firmware update image is completely loaded on the encoder 610. In step 714, once the transfer of the encrypted update image 601 is completed, the encoder 610 returns to the upload utility 602 a hash value computed from the encrypted update image 601. As described previously, the upload utility 602 may then compare the returned hash value with a pre-computed hash value to determine whether the firmware update has been successfully loaded on the encoder 610.

By using encrypted duplets to load the firmware update on the encoder, the transfer path can be secured against direct access to the sensitive content of the firmware on the encoder. Furthermore, because the encryption scheme applied on the duplets uses identification information specific to authorized target computers, impermissible uses of the firmware update on unauthorized systems can thus be prevented.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

I claim:

1. A method of generating a secure firmware update loadable on an adapter device of a target computer device, the method comprising:
    encrypting twice a same data portion of the firmware update to form an encrypted update image; and
    appending the encrypted update image to an upload utility executable on the target computer device to load the encrypted update image along a transfer path to the adapter device.

2. The method of claim 1, wherein the data portion is contained in a byte.

3. The method of claim 1, further comprising computing a digital signature associated with the encrypted update image.

4. The method of claim 1, wherein the step of encrypting twice the same data portion of the firmware update is performed with a same encryption key.

5. The method of claim 4, wherein the encryption key is computed from information specific to a type of computer system on which the use of the firmware update is authorized.

6. The method of claim 5, wherein the information specific to a type of computer system on which the use of the firmware update is authorized comprises a vendor identification number and a model identification number.

7. The method of claim 1, wherein the step of encrypting twice the same data portion of the firmware update produces a duplet of encrypted data that appear as different cipher-texts.

8. The method of claim 1, wherein the upload utility executable comprises an upload utility program configured to extract the encrypted update image, apply verification tests of the encrypted update image and the target computer device, and call functions of an application programming interface to cause graphics processing unit to load the encrypted data image along the transfer path to an encoder included in the graphics adapter.

9. A non-transitory computer-readable medium containing a sequence of instructions for generating a secure firmware update loadable on an adapter device of a target computer device, which when executed by a processor in a computer system, causes the processor to:
    encrypt twice a same data portion of the firmware update to form an encrypted update image; and
    append the encrypted update image to an upload utility executable on the target computer device to load the encrypted update image along a transfer path to the adapter device.

10. The non-transitory computer-readable medium of claim 9, further comprising a sequence of instructions which when executed by the processor, causes the processor to compute a digital signature associated with the encrypted update image.

11. The non-transitory computer-readable medium of claim 9, wherein the sequence of instructions when executed by the processor, causes the processor to use a same encryption key to encrypt twice the same data portion of the firmware update.

12. The non-transitory computer-readable medium of claim 11, wherein the encryption key is computed from information specific to a type of computer system on which the use of the firmware update is authorized.

13. The non-transitory computer-readable medium of claim 12, wherein the information specific to a type of computer system on which the use of the firmware update is authorized comprises a vendor identification number and a model identification number.

14. The non-transitory computer-readable medium of claim 9, wherein a same data portion of the firmware update when encrypted twice produces a duplet of encrypted data that appear as different cipher-texts.

15. A computer system capable of generating a secure firmware update loadable on an adapter device of a target computer device, wherein the computer system comprises:
    a memory; and
    a central processing unit configured to
        encrypt twice a same data portion of the firmware update to form an encrypted update image; and
        append the encrypted update image to an upload utility executable on the target computer device to load the encrypted update image along a transfer path to the adapter device.

16. The computer system of claim 15, wherein the central processing unit is further configured to compute a digital signature associated with the encrypted update image.

17. The computer system of claim 15, wherein the central processing unit is configured to use a same encryption key to encrypt twice the same data portion of the firmware update.

18. The computer system of claim 17, wherein the encryption key is computed from information specific to a type of computer system on which the use of the firmware update is authorized.

19. The computer system of claim 18, wherein the information specific to a type of computer system on which the use of the firmware update is authorized comprises a vendor identification number and a model identification number.

20. The computer system of claim 15, wherein a same data portion of the firmware update when encrypted twice produces a duplet of encrypted data that appear as different cipher-texts.

21. The computer system of claim 15, wherein the data portion is contained in a byte.

* * * * *